(12) United States Patent
Kalev

(10) Patent No.: US 6,308,071 B1
(45) Date of Patent: Oct. 23, 2001

(54) MONITORING TRAFFIC IN A MOBILE COMMUNICATION NETWORK

(75) Inventor: Jordan Kalev, Irving, TX (US)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/308,285
(22) PCT Filed: Nov. 18, 1996
(86) PCT No.: PCT/EP96/05096
  § 371 Date: Jul. 30, 1999
  § 102(e) Date: Jul. 30, 1999
(87) PCT Pub. No.: WO98/23115
  PCT Pub. Date: May 28, 1998
(51) Int. Cl.[7] .............................. H04Q 7/20; H04B 17/00
(52) U.S. Cl. .................... 455/446; 455/67.1; 455/453; 455/425
(58) Field of Search .................... 455/67.1, 423, 455/424, 425, 446, 453, 67.6, 422

(56) References Cited

U.S. PATENT DOCUMENTS

| | | | |
|---|---|---|---|
| 5,095,500 | | 3/1992 | Tayloe et al. ............................ 379/32 |
| 5,293,640 | * | 3/1994 | Gunmar et al. ........................ 455/446 |
| 5,305,466 | * | 4/1994 | Taketsugu .............................. 455/435 |
| 5,418,843 | * | 5/1995 | Stjernholm ............................. 379/112 |
| 5,722,072 | * | 2/1998 | Crichton et al. ....................... 455/437 |
| 5,802,473 | * | 9/1998 | Rutledge ................................ 455/441 |
| 5,930,710 | * | 7/1999 | Sawyer et al. ......................... 455/436 |
| 5,946,612 | * | 8/1999 | Johansson .............................. 455/405 |
| 5,974,320 | * | 10/1999 | Ward et al. ............................ 455/437 |
| 6,021,329 | * | 2/2000 | Kornestedt et al. ................... 455/446 |
| 6,052,598 | * | 4/2000 | Rudrapatna et al. .................. 455/456 |
| 6,141,565 | * | 10/2000 | Feurstein et al. ...................... 455/560 |
| 6,175,734 | * | 1/2001 | Desgagné et al. .................... 455/437 |

FOREIGN PATENT DOCUMENTS

| | | |
|---|---|---|
| WO 90/10342 | 9/1990 | (WO) . |
| WO 94/05098 | 3/1994 | (WO) . |
| WO 94/06222 | 3/1994 | (WO) . |

OTHER PUBLICATIONS

PCT International Search Report.

* cited by examiner

Primary Examiner—Vivian Chang
Assistant Examiner—Charles N. Appiah
(74) Attorney, Agent, or Firm—Perman & Green, LLP

(57) ABSTRACT

A method and system for monitoring traffic in a mobile communication network are disclosed which identify geographically regions of high traffic concentration or "hot spots". This is done to allow the traffic distribution within a given area to be analysed so that network operators can retrieve information concerning the places where more capacity is needed.

The hot spots are located by analysing reports from the mobile stations to identify the most often occurring cell patterns. These cell patterns can be associated with geographical locations which can then be visually displayed to identify the hot spots.

16 Claims, 11 Drawing Sheets

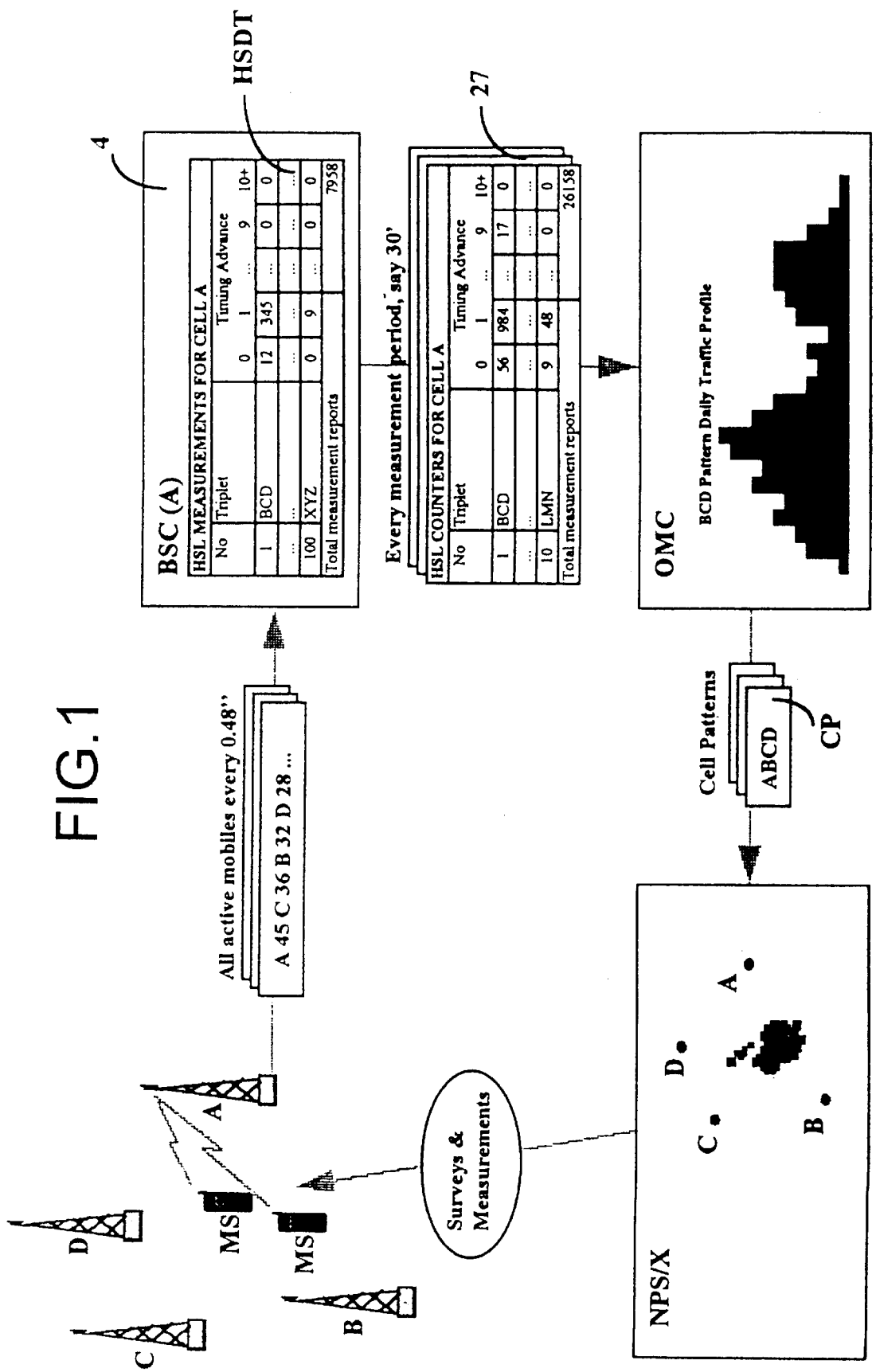

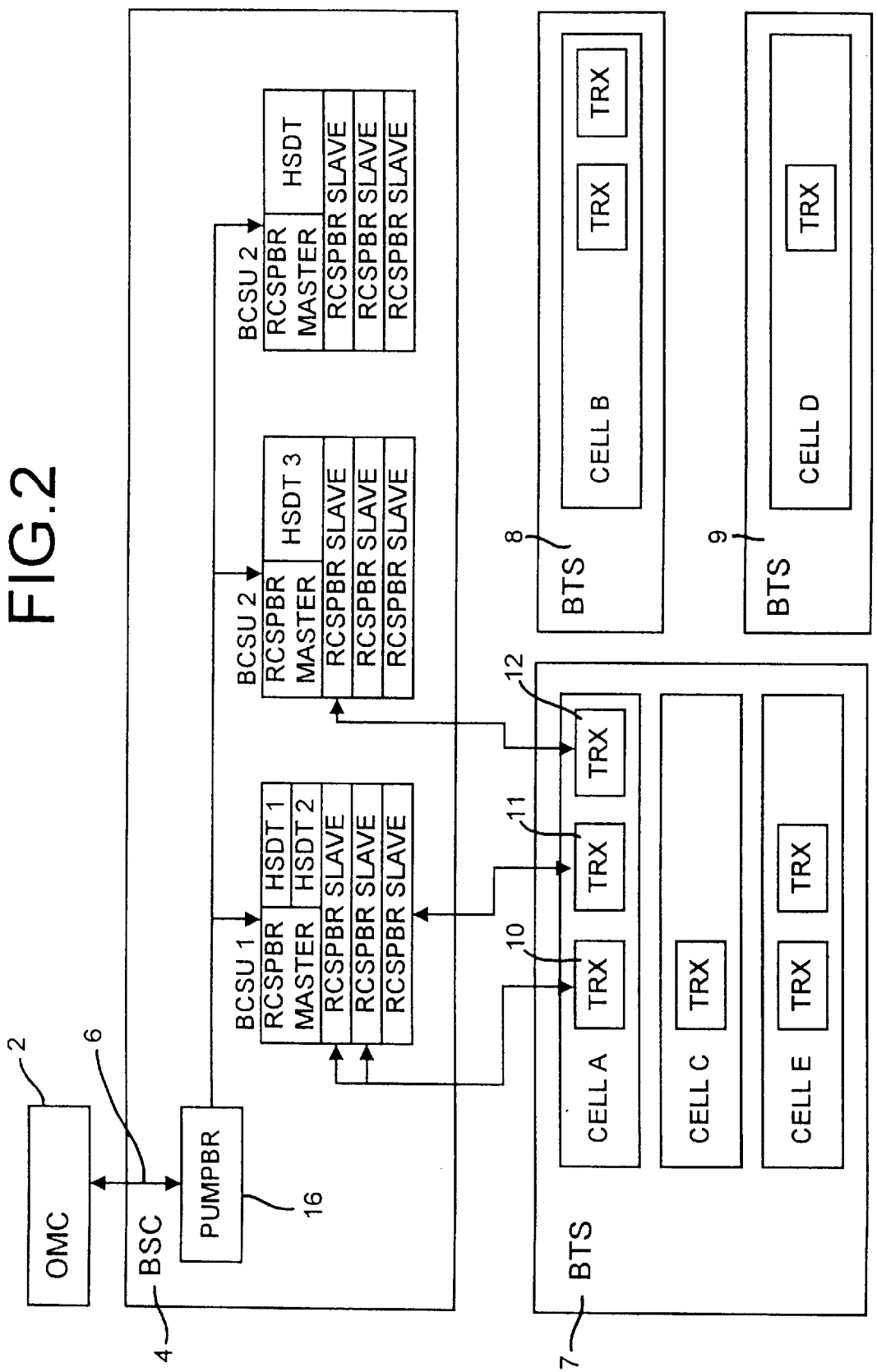

MONITORING TRAFFIC IN A MOBILE COMMUNICATION NETWORK

FIELD OF THE INVENTION

This invention relates to monitoring traffic in a mobile communication network and particularly to a method of monitoring mobile telephone traffic to identify geographically regions of high traffic concentration. Such regions are referred to herein as "hot spots".

BACKGROUND ART

It would be advantageous in a mobile communication network to be able to analyse the traffic distribution within a given area with a view to detecting areas of high traffic concentration or "hot spots". In this manner, network operators can retrieve information from the network concerning the places where more capacity is needed.

SUMMARY OF THE INVENTION

According to one aspect of the present invention there is provided a method of monitoring traffic in a mobile communication network to identify geographically regions of high traffic concentration, comprising:

a) receiving from each of a plurality of mobile stations data representing the received signal levels at that mobile station from a plurality of neighbouring cells;

b) identifying for each such mobile station, when possible, a group of the neighbouring cells having the highest received signal levels;

c) storing the identity of the cells in each group for each such mobile station; and d) identifying the most often occurring groups thereby to identify geographically the regions of high traffic concentration.

In the preferred embodiment, each group is associated with a geographical location and the geographical locations are displayed thereby to visually represent the regions of high traffic concentration. This provides a useful tool for future planning of base station installations, for example in particular the provision of microcells or an increased number of base stations.

In the described embodiment, step a) is carried out for each mobile station within an allocated serving cell, and a set of neighbouring cells having the highest received signal levels at that serving cell are identified. The group consists of the serving cell and the identified set.

Each set can contain three cells and thus constitute a triplet. In the preferred embodiment, triplets are stored at the base station controller for the serving cell. It would be possible to store sets of only two cells, so that each group would have three cells. Moreover, it would be possible to detect sets of four or more cells. The disadvantage of this is that the possible number of combinations of cells within a set increases rapidly and therefore the storage capacity of the system would have to increase. Thus, the storage of triplets is considered to be the preferred embodiment, but environmental and other considerations could affect the number of cells in a set and therefore the number of cells in a group.

The data representing the received signal levels can be collected during a predetermined time period. This time period could be set for example by an operating control centre (OMC—operation and maintenance centre according to GSM standard), or by the base station controller itself.

As is known according to the GSM standard, data defining the received signal level of the serving and neighbouring transmission cells is transmitted from each mobile station via its traffic channel.

For each mobile station, it is also possible to store timing advance information reported by the mobile stations for the serving cell. This timing advance information can be used to amend the geographical location of high traffic concentration since it is directly related to the distance between the mobile station and the serving base station.

According to another aspect of the present invention there is provided a system for identifying geographically regions of high traffic concentration in a mobile communication network, the system comprising:

means for receiving from each of a plurality of mobile stations data representing the received signal levels from a plurality of neighbouring cells;

means for identifying for each mobile station, where possible, a group of the neighbouring cells having the highest received signal levels; and a store for storing the identity of the cells in each group, with an indication of the number of times that group has been identified whereby the most often occurring groups can be identified.

The system can be located at a base station controller controlling at least one of the cells.

The base station controller can comprise a plurality of base station control units for controlling a plurality of transceivers and a performance control block connected to said base station control units to transmit an instruction requesting the collection of data identifying said groups, each base station control unit comprising means for determining whether or not that instruction refers to a transceiver controlled by that base station control unit, and for discarding the instruction if not.

In accordance with another aspect of the invention there is provided a mobile communication network which operates to identify regions of high traffic concentration, the network comprising:

a plurality of base stations for defining cells in the network;

at least one base station controller for controlling said base stations, and including a system comprising means for receiving from each of a plurality of mobile stations data representing the received signal levels from a plurality of neighbouring cells in the network, means for identifying for each mobile station, when possible, a group of the neighbouring cells having the highest received signal levels, and a store for storing the identity of the cells in each group, with an indication of the number of times that group has been identified whereby the most often occurring groups can be identified; and an operating control centre which defines a predetermined time period over which data defining said groups is collected, and which communicates with said at least one base station controller to instruct the collection of said data for said predetermined time period.

This data is referred to herein as "hot spot" data.

BRIEF DESCRIPTION OF THE DRAWINGS

For a better understanding of the present invention and to show how the same may be carried into effect, reference will now be made by way of example to the accompanying drawings in which:

FIG. 1 is a diagrammatic representation illustrating the concept underlying the identification of hot spots;

FIG. 2 is a block diagram of a mobile communication installation including a system for collecting hot spot data;

DETAILED DESCRIPTION OF THE PREFERRED EMBODIMENTS

Figure 3A:
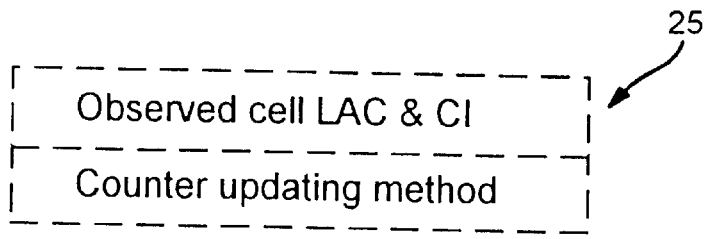
FIGS. 3a and 3b represent start and stop measurements for hot spot data collection.

Referring firstly to FIG. 1, transmitters A, B, C and D are used to diagrammatically represent cells A, B, C, D. In fact, it is possible for a single base station to define more than one cell, and for a cell to contain more than one transceiver. One particular cell configuration is discussed in more detail in the following, but the principles underlying the hot spot location technique can be discussed with reference to cells A, B, C and D as diagrammatically represented in FIG. 1. These principles can be used for any cellular configuration. All active mobile stations MS within cell A report to the base station controller 4 for cell A, BSC(A), every 0.48 seconds while in dedicated mode. This is done in a known fashion according to the GSM standard. Each mobile unit reports to the base station controller the received signal level of the serving cell A and its six best cells. One such report is shown in FIG. 1, where cell A has a signal level of 45 dB, cell B—32 dB, cell C—36 dB and cell D—28 dB. In the example given in FIG. 1, this could include cells B, C, D (illustrated) and other cells E, F, G, etc (not illustrated). At the base station controller, the three best neighbours are identified and are stored as a triplet in a hot spot data table HSDT at the base station controller 4. The mobile stations MS also report their timing advance data, again in a known manner according to the GSM standard. This timing advance information is stored in the hot spot data table together with the identified triplet of that report. Information on the overall traffic level based on the number of reports is also stored in the hot spot data table.

Hot spot data of the type outlined above is collected and stored in the hot spot data table HSDT over a predetermined measurement period of for example 30 minutes. At the end of each measurement period hot spot data information 27 is transmitted to an operation and maintenance centre OMC. The hot spot data information includes data on the ten most often occurring triplets for the serving cell A. In addition to the hot spot data information, traffic information is also transferred to the operation and maintenance centre OMC to build up a traffic profile for each triplet as illustrated in FIG. 1. This traffic profile indicates the percentage of cell traffic associated with the triplet for each hour in the day. At the OMC, the triplet data is collated to identify the most often used cell patterns (CPs) or groups of cells. For the serving cell A, the most often occurring triplets have been identified in the hot spot data information transmitted from the base station controller BSC to the operation and maintenance centre OMC. Similar data can be collected for serving cell B, C, D, etc. The data over all the cells can then be collated to collect together all data referring to cell pattern <ABCD> for example. This would include the triplet information for triplet BCD in serving cell A and triplet information BCA in serving cell D for example. In this manner, the level of use of the cell pattern ABCD can be determined. Likewise, the level of use of other cell patterns in the cell network can be determined.

These cell patterns and information concerning their usage is transmitted to a network planning system NPS/X. This can be done by transferring information on disk or on paper, or by a hardwired or RF link or in any other convenient manner. At the network planning system, based on the predicted cell coverage areas each cell pattern is used to identify a geographical location on a digital map, where each cell pattern identifies a group of pixels. Areas of high traffic concentration can then readily be seen.

It will be appreciated that there are other ways of using the cell pattern data apart from displaying a visual representation of the cell pattern data, although it is expected that a visual representation will be the most useful form as a planning tool.

One embodiment for implementing the above-described concept will now be described with reference to FIG. 2.

FIG. 2 illustrates diagrammatically relevant components of a mobile communication installation for implementing hot spot data collection. The installation comprises an operation and maintenance centre 2 which is in communication with a base station controller (BSC) 4 via a communication link 6. The base station controller 4 controls a plurality of base stations (BTS). Each base station can have several cells. Each cell can have several transceivers (TRS). Each transceiver can handle up to eight calls, i.e. with the mobile stations in dedicated mode, simultaneously. FIG. 2 illustrates three base stations 7,8,9. The base station 7 has three cells, cells A, C and E. The base stations 8 and 9 each have one cell, B and D respectively. In the described embodiment, hot spot data is collected for one serving cell at a time, and in the following description this serving cell will be cell A. It is collected from all transceivers 10, 11, 12, belonging to cell A. Measurement reports from mobile stations MS served by cell A are received from the transceivers 10, 11, 12. These reports are transmitted from the mobile stations in accordance with the GSM standard and, among other things include the received signal levels from the serving cell and the six best neighbouring cells, as well as timing advance (TA) last used by the mobile station. This data is collected at the base station controller and is used in the normal manner for controlling operations of like handovers or changes of the radiated power levels. The known use of this data and the nature of the data itself is not described herein because it is known in the art.

The base station controller 4 comprises a performance control block 16 which is connected to the communication link 6 with the operating management centre 2. The performance control block 16 is connected to each of a plurality of base station control units BSCU1, 2, 3. The base station control units each control a number of base stations 7, 8, 9. Each base station control unit BSCU has an RCSPRB (radio connection supervision program block) master process and a set of RCSPRB slave processes. Each slave process collects information from mobile stations via a particular transceiver. In the illustrated example, BSCU1 collects data from transceivers 10 and 11 for cell A. BSCU2 has slave processes which collect data for transceiver 12 in cell A. It will readily be appreciated that there are a number of different ways of organising the relationship between the transceivers and the slave processes, depending on the way in which the installation is set up.

The base station controller 4 also contains hot spot data tables HSDT1, 2, 3 which are stores for holding hot spot data collected from the base stations. These hot spot data tables exist in the data areas of the RSCPRB master processes. Each BCSU can have several HSDTs. There is one hot spot data table for each transceiver, and it is accessible to those RCSPRB slave processes handling calls for that transceiver. In this example, HSDT1 is the hot spot data table for cell A, transceiver 10 HSDT2 is the table for transceiver 11, and HSDT3 in the table for transceiver 12.

Operation of the system to collect hot spot data will now be described. The measurement is started with a specific start measurement transmitted from the OMC 2 to the BSC 4. The format of this start message 25 is illustrated in FIG. 3a and includes information of the observed cell by the location area code (LAC) and cell identity (CI) and the counter updating method (described in more detail hereinafter).

After receiving the hot spot measurement start message 25 from the OMC 2, the performance control block 16 sends the start message 25 to the RCSPRB processes in each base station control unit BSCU1, 2, 3.

Figure 3B:
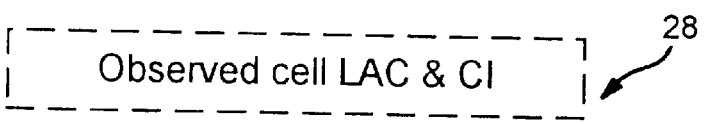

In a similar manner, a stop message 28 can be sent from the OMC 2 to the base station controller 4 to stop hot spot data collection. The format of this stop message is illustrated in FIG. 3b. The RCSPRB master process in each base station control unit BSCU1, 2, 3 receives the start and stop messages. Only those RCSPRB processes that handle the calls of the observed cell (in this example cell A) will accept these messages. Other RCSPRB processes discard the start and stop messages.

If a hot spot measurement is already being implemented by an RCSPRB master process, and a new hot spot measurement start message is received, the new start message will be discarded.

Figure 4:
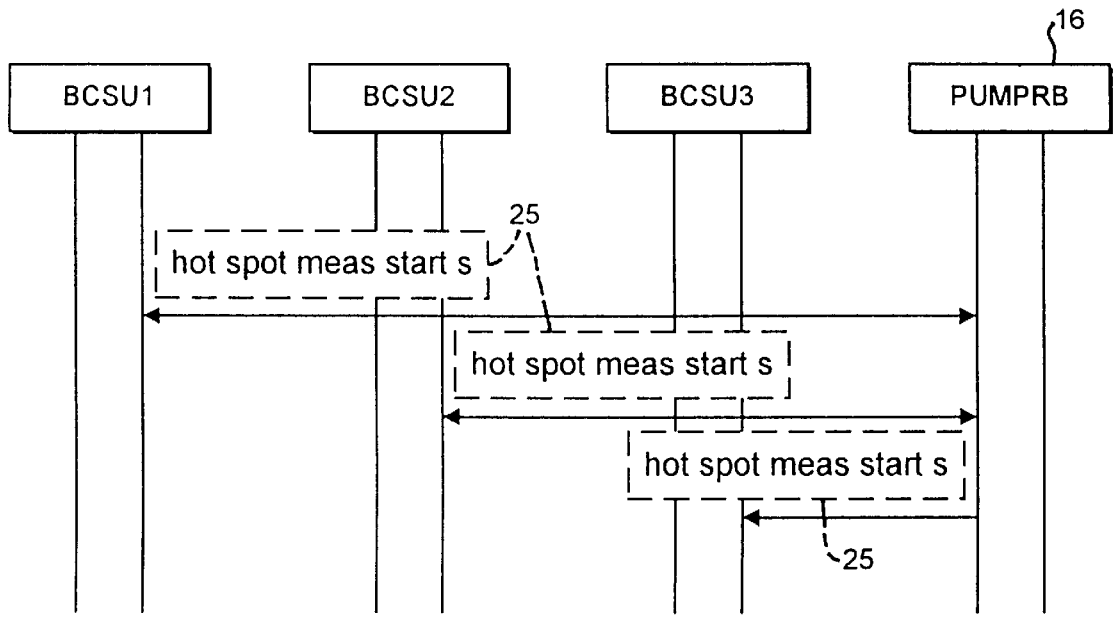
FIGS. 4, 7, 8 and 9 illustrate transmission of control information between the performance control block and the base station control units within a base station controller.

The transmission of the hot spot measurement start message from the performance control block 16 to the base station control units is illustrated in FIG. 4a.

The hot spot measurement start message is received by the RCSPRB master processes which inform their associated RCSPRB slave processes. The slave processes collect timing advance data and triplet data according to the instructions of the master process, and store these in a hot spot data table HSDT.

Figure 5:
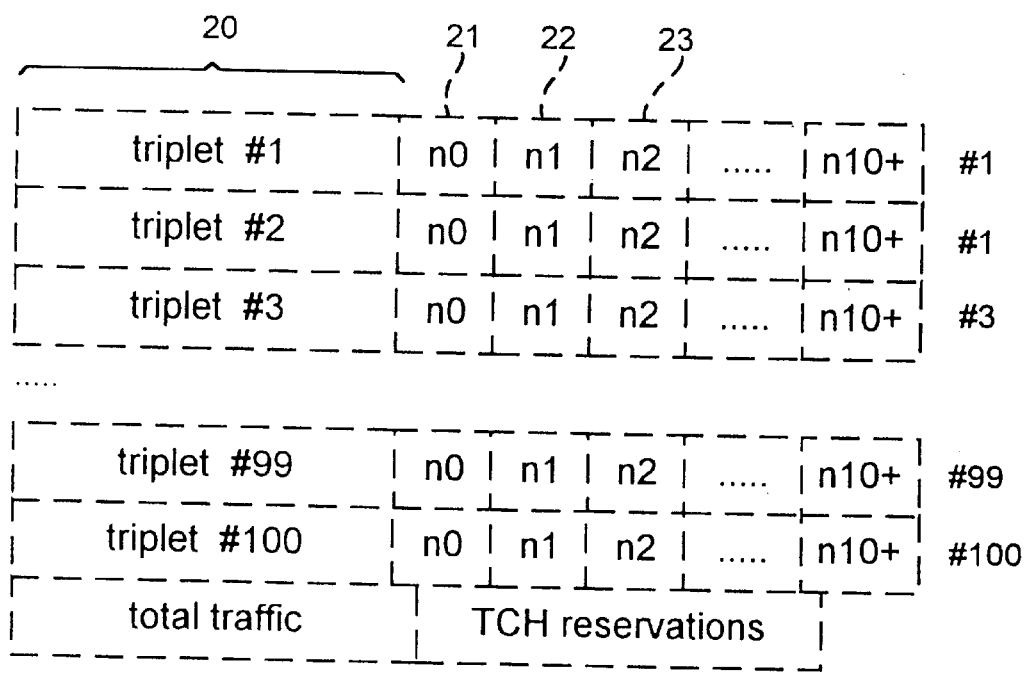
FIG. 5 illustrates the contents of a hot spot data table.

The hot spot data tables in the data area of the master process constitute a table of a hundred items where the number of triplet appearances and timing advance distribution counters are stored. An example of such a table is shown in FIG. 5. Thus, the left hand column 20 represents triplet identities which are indicated in FIG. 5 as triplet #1, triplet #2 . . . triplet #100. These are the same as the triplet identities BCD . . . XYD illustrated in the hot spot data table in FIG. 1. Associated with each triplet number is a plurality of subsequent columns 21, 22, 23, etc, each of which holds a count of the timing advance information which was reported with that particular triplet. Column number 1 holds a count of timing advance zero, column 22 holds a count of timing advance one, column 23 holds a count of timing advance two etc. There are ten such columns in the example given in FIG. 5. As an example, each time triplet number one is reported with timing advance one, the column 22 is updated for triplet number one. In this way, timing advance information for each triplet is held in the table.

The hot spot data table HSDT also contains a measure of the total traffic based on the number of reports, and a count of the TCH reservations. The TCH (traffic channel) reservation counter is incremented by one every time a traffic channel is allocated to a call. This is the case for call set-up phases and for handovers.

The hot spot data tables HSDT are updated by the RCSPRB slave processes handling calls in the observed cell A. The table is updated after the reception of each measurement report from each mobile station MS. The table is updated depending on the already existing triplets stored in the table and on a free slot indicator (described later).

As is known, according to the GSM standard, each mobile station in cell A periodically conveys to the base station data defining the received signal levels from the serving cell and a plurality of neighbouring cells (typically six) and data defining its timing advance used for the last transmission. This data is transmitted while the mobile stations are in dedicated mode and is sent on the traffic channel. The data which is transmitted by each mobile station representing the received signal levels from a plurality of cells is transmitted to the slave processes.

When a RCSPRB slave process receives a radio link measurement report from a mobile station MS via its transceiver, it determines the three best adjacent cells according to the reported signal levels in the measurement report. If there are less than three adjacent cells reported, the RCSPRB slave process increments only the total traffic counter of the current base station hot spot data table by one.

If the RCSPRB slave process has been able to determine the three best adjacent cells, that is the triplet to be stored, it will attempt to locate whether or not that triplet had already been stored in the hot spot data table for that base station. This is done by searching the table from the beginning up to the index free slot minus one. If the reported triplet already exists in the data table (that is if the local area codes and cell identities match), then the corresponding timing advance counter in the appropriate column (depending on the amount of timing advance 0 to 9 or greater than 10) is updated according to the indicated timing advance in the radio link measurement report. The total traffic count is also updated.

If the reported triplet does not match an already existing triplet in the table, it is added to the hot spot data table of the reporting base station. Furthermore, the timing advance information reported in the radio link measurement report is updated in the timing advance distribution in the appropriate column.

If the hot spot data table is full (that is its free slot index is 100), then the total traffic counter is updated, but no extra triplet is stored.

In any case, the traffic counter is incremented by one after the reception of each radio link measurement report of the current base station.

Each triplet in the hot spot data table is represented as a 32 bit word, one bit per adjacent cell. As described above, when the RCSPRB slave process receives the radio link measurement report, it determines the three best adjacent cells. The bits in a triplet identifier are set to one according to these three best adjacent cells and according to the adjacent cell index file of the RCSPRB master process. The adjacent cell index file of the RCSPRB master process contains the reported signal levels for a plurality of neighbouring cells. This information is normally provided according to the GSM standard, but conventionally is only stored for a short time to make control decisions and is updated. In accordance with the presently described embodiment of the invention, however, this information is used to determine the three best adjacent cells (triplets) and this information is used to set bits in the 32 bit variable which constitutes the triplet identifier.

As an example, if the adjacent cell indexes of the three best adjacent cells reported in the radio link measurement report are 1, 7 and 10, then the triplet identifier has bits 1, 7 and 10 set to one with all the remaining bits being zero.

For the purposes of identification of the triplet, the order of adjacent cells is irrelevant. That is triplet [1, 7, 10 ] is the same as triplet [10, 1, 7 ]. In either case, bits 1, 7 and 10 are set to one.

The hot spot data is collected continuously by the RCSPRB master process if the hot spot measurement has been set on by the hot spot start message from the OMC 2.

Figure 6A:
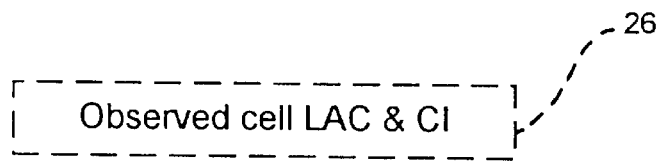
FIGS. 6a and 6b represent a hot spot data request and hot spot data information message respectively.
Figure 6B:
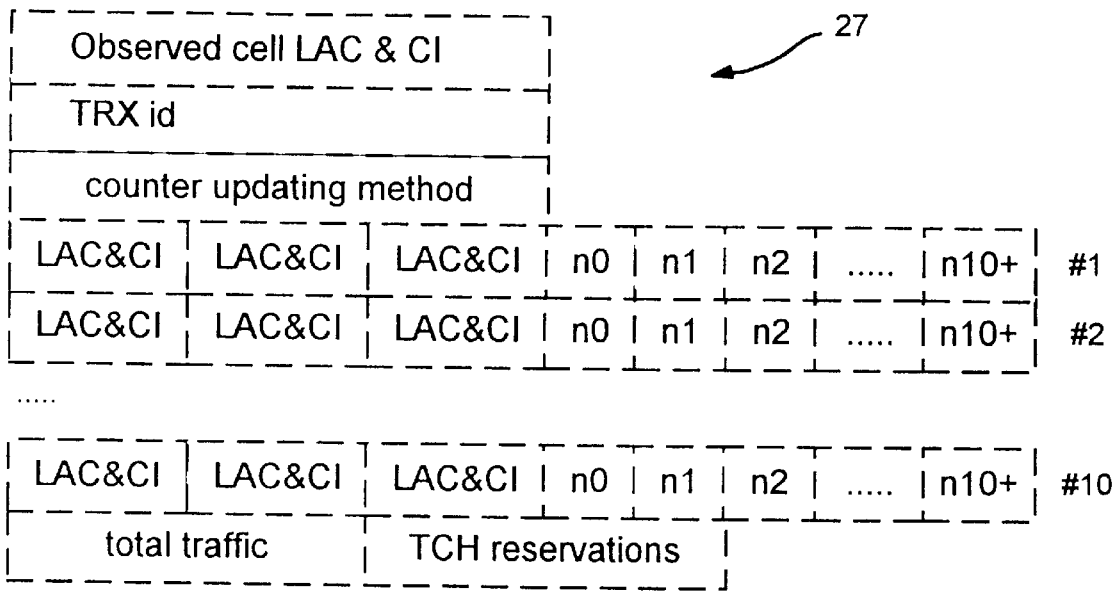

Periodically, the performance control block 16 requests the measurement data results according to the measurement period defined by the OMC 2. The format of a hot spot data request message 26 is illustrated in FIG. 6a. After receiving such a data request, the RCSPRB master process sends hot spot measurement data 27 to the performance control block 16. This data takes the form illustrated in FIG. 6b. That is, it includes the ten most frequently reported triplets with their timing advance distribution counters. It also includes data defining the observed cell by its local area code and cell identity, the identity of the transceiver (TRX id) and the counter updating method. It also include information about the total traffic and the TCH reservations.

After the RCSPRB master process has responded to the performance control block 16, it initialises the hot spot data table HSDT and continues to collect new data. In initialising the table, the RCSPRB master process stores the local area code and cell identity of the ten most frequently appeared triplets in the beginning of the data table, and sets all the timing advance distribution counters to zero. At the beginning of a hot spot data collection period, the hot spot data tables are all initialised and the free slot indexes are set to zero. However, the free slot indexes are set to ten after a data request has been made by the performance control block 16, because on initialisation of the hot spot data table after such a request, the ten most frequent triplets are stored at the beginning of the data table.

Figure 7:
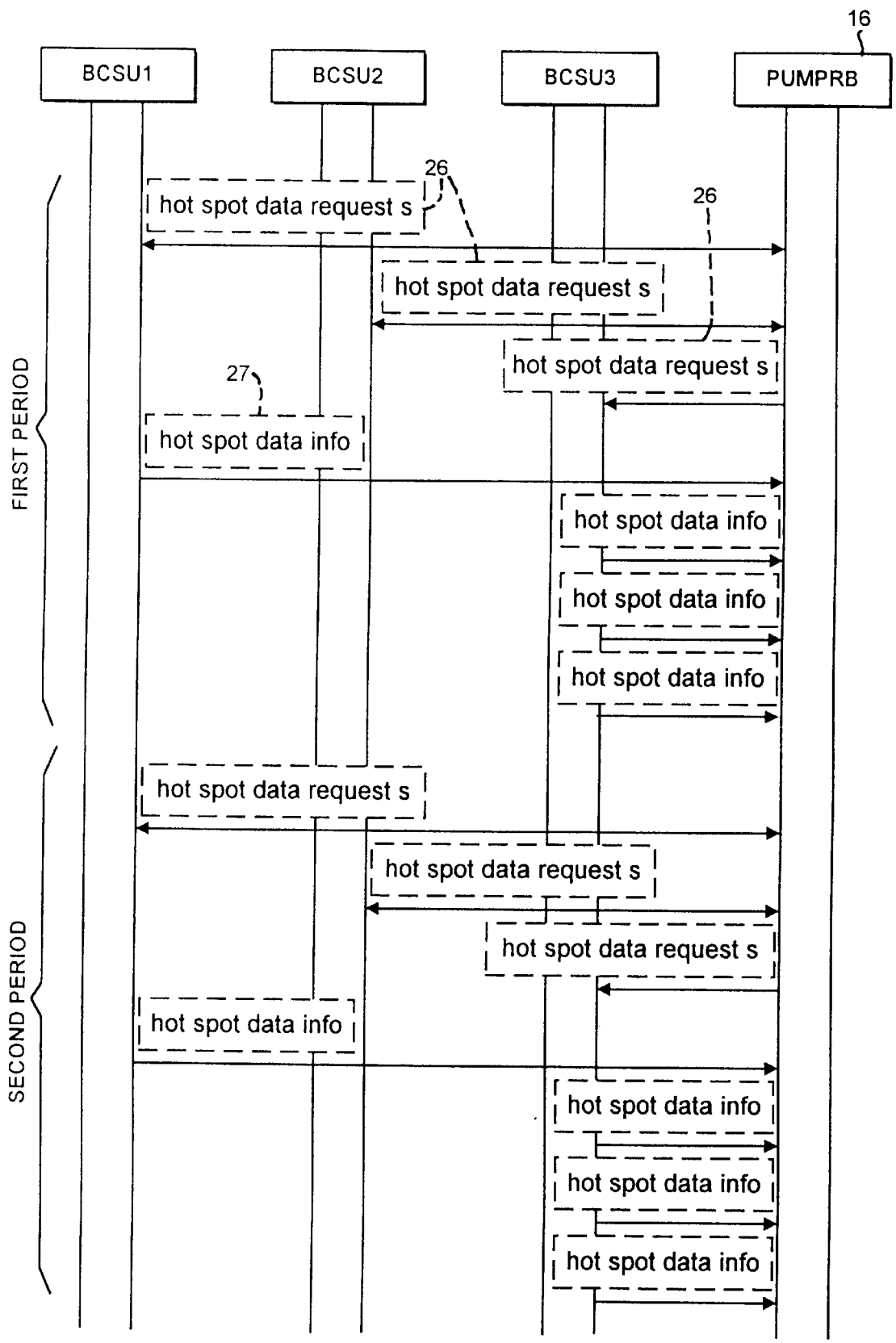

FIG. 7 illustrates the flow of messages between performance control block 16 and the base station control units BSCU1, 2, 3 when a hot spot data request is transmitted from the performance control block 16 to the base station control units.

Figure 8:
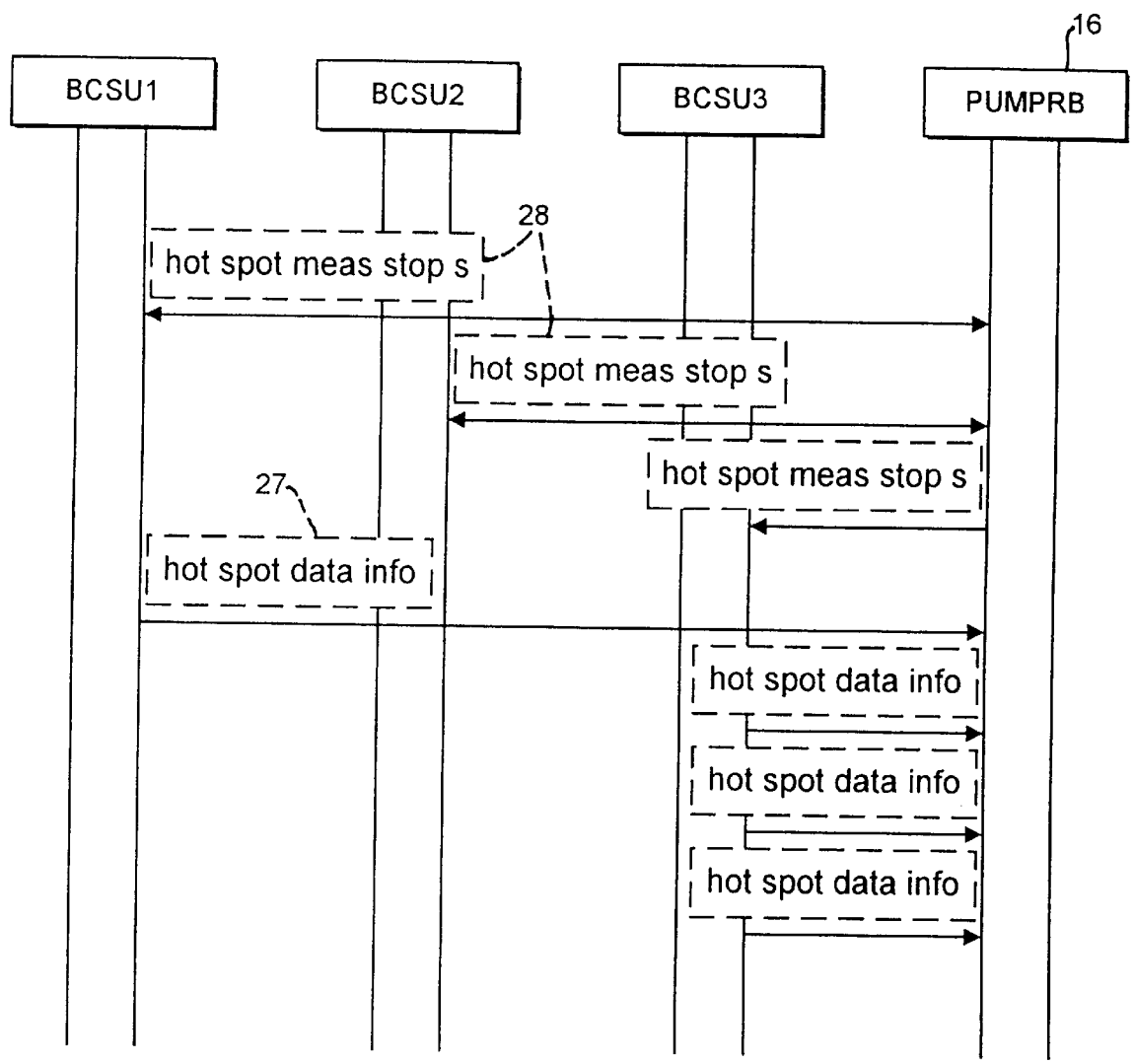

FIG. 8 illustrates the flow of messages between the performance control block 16 and the base station control units when a hot spot measurement stop message is transmitted. Note that hot spot data information continues to be returned from the base station control units to the performance control block 16 even after a hot spot measurement stop message has been transmitted.

When the performance control block 16 has received the hot spot measurement data from the base station control unit BSCU1, 2, 3 it stores the hot spot measurement data from the hot spot data tables for serving cell A into files, and adds a time stamp to each file.

Figure 9:
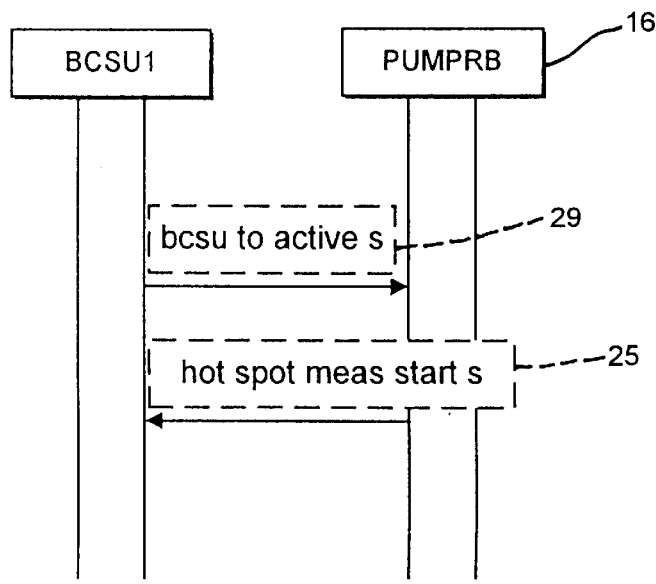

In the case of reset of a base station control unit, or controlled switchover of a base station control unit, a base station control unit is switched from an inactive to an active state. When this occurs, the RCSPRB master process sends a message to the performance control block 16 indicating that that particular base station control unit has been set to an active state. If a hot spot collection is currently set in the base station controller, the performance control block sends the hot spot measurement start message to that particular slave process in the base station control unit in question. That slave process then acts as in the beginning of hot spot data collection. These messages are shown in FIG. 9. In FIG. 9, reference numeral 29 denotes the message indicating that the base station control unit has been set to an active state. As before, reference numeral 25 denotes the hot spot measurement start message.

Annexe A summarises the new messages which are used to implement the described embodiment of the present invention.

Two experiments have been carried out to show the effectiveness of the described hot spot location technique.

Figure 10:
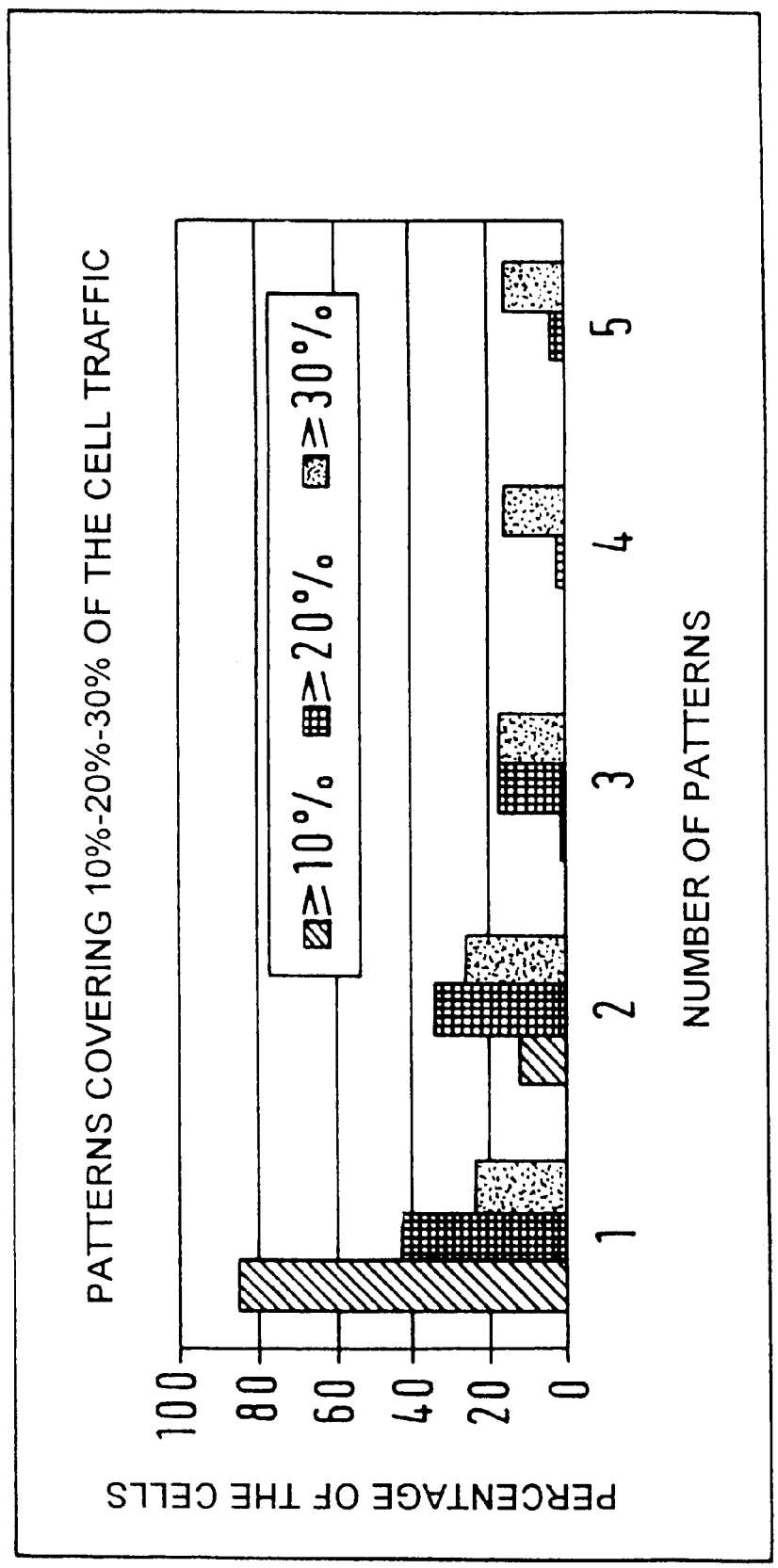
FIG. 10 is a bar chart representing statistical information produced from hot spot data.

Statistics were collected from 62 city cells in Finland and UK, with a total number of measurement reports from mobile stations of about 565,000. The top ten cell patterns for each cell were identified, without taking the timing advance into account. The collected data is shown in FIG. 10. In FIG. 10, the dark blocks represent a proportion of cell traffic greater than or equal to 10%. The square hatched blocks represent telephone traffic greater than or equal to 20%. The shaded blocks represent cell traffic greater than or equal to 30%. The percentage of cells having certain characteristics are indicated in the X direction. In the Y direction, data is collected for five different cases, representing the number of patterns used. Thus, the left hand block of three columns represents a situation where there was one dominant cell pattern. The right hand block of three columns represents the situation where there were five dominant cell patterns.

Looking at the results shown in FIG. 10, it can be seen that:

1. Not all cells contain hot spots. In about 15% of the studied cells, the first cell pattern is related to less than 10% of the traffic and 30% of the traffic is distributed over five or more cell patterns.
2. In about 25% of the cells there exists one extremely hot cell pattern. More than 30% of the cell traffic belongs to a single cell pattern only.
3. A hot cell pattern is present in about 20% of the cells, where the dominant cell pattern carries from 20% to 30% of the cell traffic.
4. In 40% of the cases, the top cell pattern covers 10% to 20% of cell traffic, so there is a potential hot cell pattern.

Figure 11:
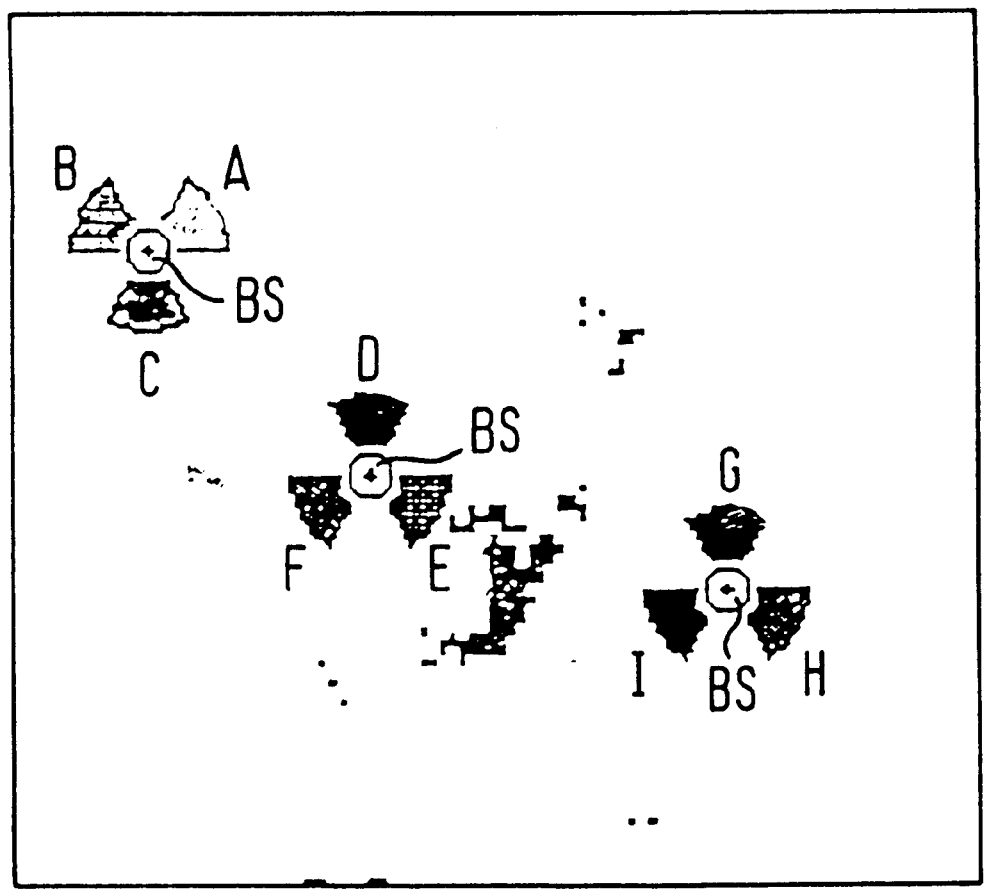
FIGS. 11 and 12 are each parts of a display representing visually geographical locations of hot spots.
Figure 12:
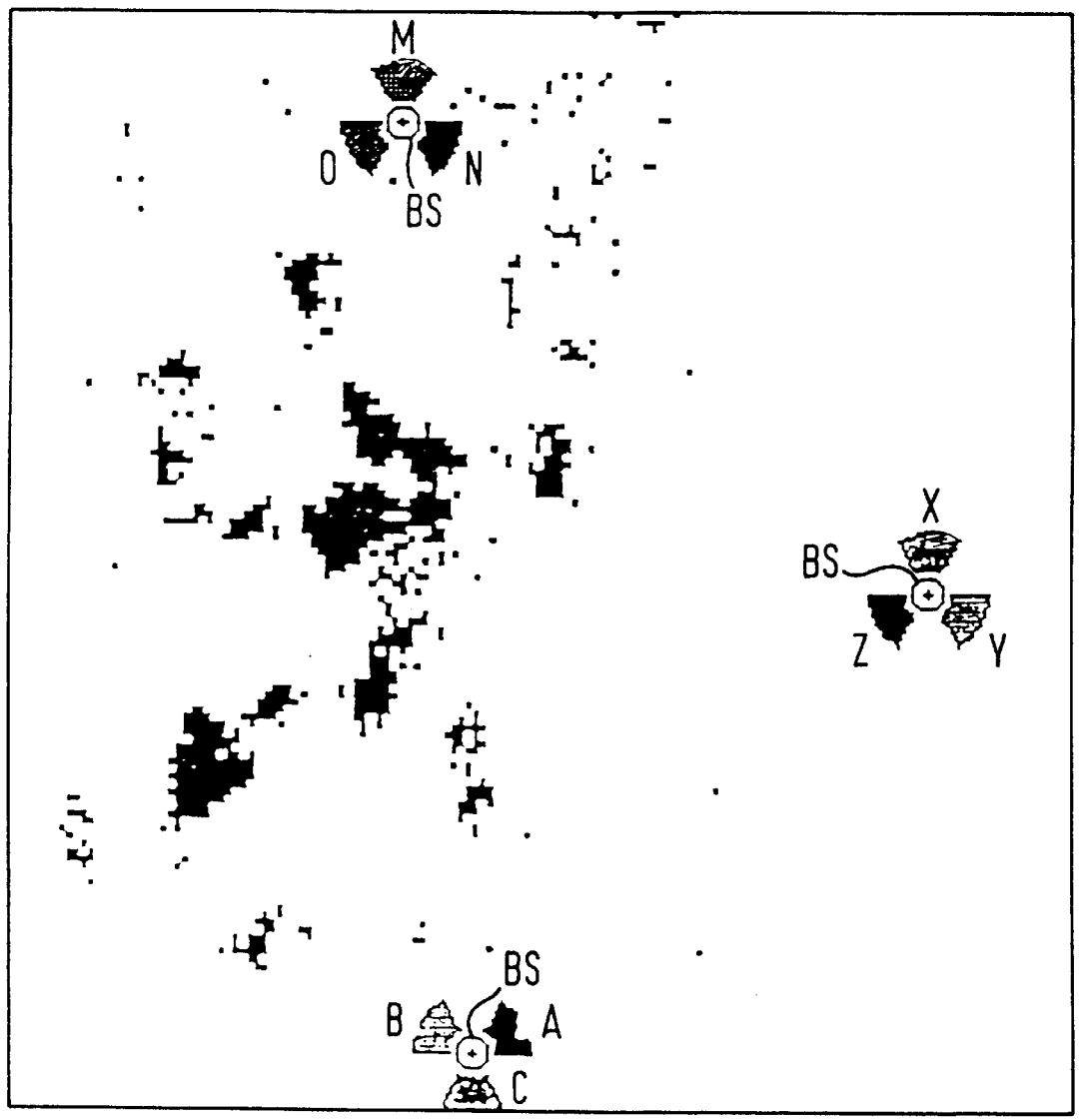

The second experiment concerns the presentation of data. The display at the network planning station in FIG. 1 is pixellated with each pixel representing a geographical area of 50×50 meters. About 50% of the cell patterns were presented by compact areas, which can be easily identified with hot spots. FIG. 11 is a good example of this. In other areas, the occurrence of traffic is more scattered and in such a situation further analysis would be required to more clearly identify hot spots. Nevertheless, useful information concerning the distribution of telephone traffic can be gained even in these cases.

Figure 13:
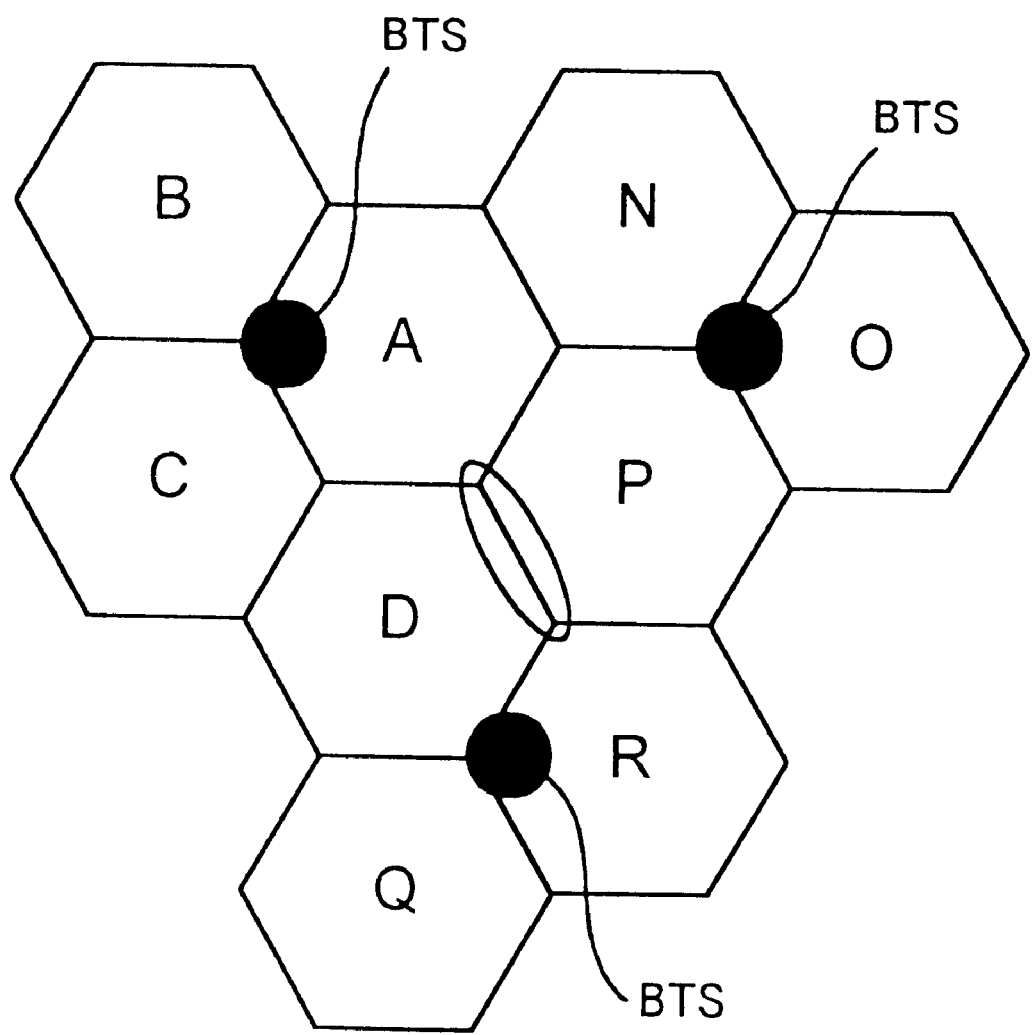
FIG. 13 is a diagram of part of a cellular network.

FIG. 13 is a simplified illustration of a cellular network using a regular grid. It shows the areas and associated patterns which are most likely to be reported during the hot spot measurements.

| Annexe A | |
|---|---|
| Name of the message: | hot_spot_meas_starts_s = 0 × XXXX |
| Data type: | <Name of the data type> |
| Interface: | PUMPRB → RCSPRB in all BCSUs |
| Usage: | This message is used in indicating the start of the Hot spot location measurement. |

-continued

Annexe A

| | |
|---|---|
| Name of the message: | hot_spot_meas_stop_s = 0 × XXXX |
| Data type: | <Name of the data type> |
| Interface: | PUMPRB → RCSPRB in all BCSUs |
| Usage: | This message is used in indicating the stop of the hot spot location measurement. |
| Name of the message: | hot_spot_data_request_s = 0 × XXXX |
| Data type: | <Name of the data type> |
| Interface: | PUMPRB → RCSPRB in all BCSUs |
| Usage: | This message is used in requesting the hot spot measurement data from the RCSPRB. |
| Name of the message: | hot_spot_data_info_s = 0 × XXXX |
| Data type: | <Name of the data type> |
| Interface: | RCSPRB → PUMPRB |
| Usage: | This message is used in providing the hot spot measurement data to the PUMPRB. |
| Name of message: | bcsu_to_active_s = 0 × XXXX |
| Data type: | <Name of the data type> |
| Interface: | RCSPRB → PUMPRB |
| Usage: | This message is used in indicating the PUMPRB of an active BCSU after reset or controlled switchover. |

What is claimed is:

1. A method of monitoring traffic in a mobile communication network to identify geographically regions of high traffic concentration, comprising:
   a) receiving from each of a plurality of mobile stations data representing the received signal levels at that mobile station from a plurality of neighboring cells;
   b) identifying for each such mobile station, a group of the neighboring cells having the highest received signal levels;
   c) storing the identity of the cells in each group for each such mobile station; and
   d) identifying the most often occurring groups thereby to identify geographically the regions of high traffic concentration.

2. A method according to claim 1, wherein each group is associated with a geographical location, and wherein the geographical locations are displayed thereby to visually represent the region of high traffic concentration.

3. A method according to claim 1, wherein step a) is carried out for each mobile station within an allocated serving cell, and wherein a set of neighboring cells having the highest received signal levels at that serving cell are identified whereby the group consists of the serving cell and the identified set.

4. A method according to claim 3, wherein there are three cells in each set, whereby each set constitutes a triplet.

5. A method according to claim 2, when carried out for a plurality of allocated serving cells.

6. A method according to claim 2, wherein the sets are stored at the base station controller for the serving cell.

7. A method according to claim 1, wherein data representing the received signal levels for identifying the cells having the highest received signal levels is collected during a predetermined time period.

8. A method according to claim 1, wherein data defining the received signal levels of the neighboring transmission cells is transmitted from each mobile station via its traffic channel.

9. A method according to claim 1, wherein timing advance information is stored for each group of cells, the timing advance information being updated each time that group is identified.

10. A method according to claim 9, wherein the timing advance information is used as an additional indication of said geographical regions of high traffic concentration.

11. A method according to claim 1, wherein the overall level of traffic is monitored, regardless of whether or not a group of neighboring cells is identified.

12. A system for identifying geographically regions of high traffic concentration in a mobile communication network, the system comprising:
   means for receiving from each of a plurality of mobile stations data representing the received signal levels from a plurality of neighboring cells;
   means for identifying for each mobile station, a group of the neighboring cells having the highest received signal levels; and
   a store for storing the identity of the cells in each group, with an indication of the number of times that group has been identified whereby the most often occurring groups can be identified.

13. A system according to claim 12 when located at a base station controller controlling at least one of said cells.

14. A system according to claim 13, wherein the base station controller comprises a plurality of base station control units for controlling a plurality of transceivers and a performance control block connected to said base station control units to transmit an instruction requesting the collection of data identifying said groups, each base station control unit comprising means for determining whether or not that instruction refers to a transceiver controlled by that base station control unit, and for discarding the instruction if not.

15. A mobile communication network which operates to identify regions of high traffic concentration, the network comprising:
   a plurality of base stations for defining cells in the network;
   at least one base station controller for controlling said base stations, and including a system comprising:
   means for receiving from each of a plurality of mobile stations data representing the received signal levels from a plurality of neighboring cells in the network,
   means for identifying for each mobile station a group of the neighboring cells having the highest received signal levels, and a store for storing the identity of the cells in each group, with an indication of the number of times that group has been identified whereby the most often occurring groups can be identified; and
   an operating control center which defines a predetermined time period over which data defining said groups is collected, and which communicates with said at least one base station controller to instruct the collection of said data for said predetermined time period.

16. A network according to claim 15, wherein the base station controller comprises a plurality of base station control units for controlling a plurality of transceivers, and a performance control block connected to said base station control units to transmit an instruction requesting the collection of data identifying said group, each base station control unit comprising means for determining whether or not that instruction refers to a transceiver controlled by that base station control unit, and for discarding the instruction if not.

* * * * *